United States Patent [19]
Brooks et al.

[11] 4,005,097
[45] Jan. 25, 1977

[54] OXYFORMAMIDATES

[75] Inventors: John Langshaw Brooks; Richard Budziarek; James William Crook; Edward Jervis Vickers, all of Manchester, England

[73] Assignee: Imperial Chemical Industries Limited, London, England

[22] Filed: Feb. 20, 1976

[21] Appl. No.: 659,636

Related U.S. Application Data

[62] Division of Ser. No. 524,948, Nov. 18, 1974.

[30] Foreign Application Priority Data

Nov. 30, 1973 United Kingdom ............. 55659/73

[52] U.S. Cl. .................... 260/295 Q; 260/78 R; 260/79.3 M; 260/239 BF; 260/246 B; 260/247.1 R; 260/247.2 B; 260/268 N; 260/293.85; 260/326.2; 260/397.7 R; 260/471 C; 260/479 C; 260/482 B; 260/482 C; 260/556 A
[51] Int. Cl.² ..................................... C07D 213/20
[58] Field of Search ............... 260/295 AMQ

[56] References Cited

UNITED STATES PATENTS 3,755,337   8/1973   Carey ........................ 260/295 Q
3,786,058   1/1974   Edwards ..................... 260/295 Q

*Primary Examiner*—Norman A. Drezin
*Attorney, Agent, or Firm*—Cushman, Darby & Cushman

[57] ABSTRACT

Compounds of the formula $$A\left(-X-\bar{N}-\overset{+}{N}\diagup\diagdown\right)_n$$

wherein A is a linking group, X is an O—CO— or —SO$_2$— group and $n$ is at least 2, are prepared from the corresponding N′,N′-disubstituted hydrazides by quaternization and treatment with alkali or reaction with an alkylene epoxide or from the corresponding compound wherein $n = 1$ and A is a polymerizable group by polymerization. The compounds are unstable to heat and may be used as cross-linking agents for polymers or as chain-extending agents, bonding agents or adhesives.

1 Claim, No Drawings

OXYFORMAMIDATES

This is a division, of application Ser. No. 524,948 filed Nov. 18, 1974.

This invention relates to nitrogen-containing compounds and more particularly to ammonioamidates containing two or more oxyformamidate or sulphonamidate groups.

According to the invention there are provided ammonio amidates of the formula

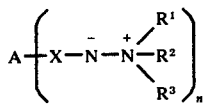

wherein A is a linking group to which the groups X are attached at alkyl, cycloalkyl or aryl carbon atoms, X is a group of the formula —O—CO— or —SO$_2$—, $n$ is an integer of value at least 2, and R$^1$, R$^2$ and R$^3$, which may be the same or different, are each an optionally substituted alkyl, alkenyl, cycloalkyl or aralkyl group or R$^1$ and R$^2$ together with the nitrogen atom joining them form a heterocyclic ring or R$^1$, R$^2$ and R$^3$ together with the nitrogen atom joining them form one or two heterocyclic rings.

As linking groups represented by A there may be mentioned alkylene groups such as ethylene, 1,2- and 1,3-propylene, tetramethylene, hexamethylene, decamethylene, and dodecamethylene, cycloalkylene such as 1,4-cyclohexylene, arylene such as m- and p-phenylene, groups derived from combinations of the foregoing groups such as methylene-bis-4-phenyl-, 2,2-propylene-bis-4-phenyl-, m- and p-xylylene, groups derived from one or more of the foregoing groups linked by heteroatoms or groups containing hetero atoms, such as 1,4-phenylene-bis-oxyethyl-, from polyalkylene oxides such as polyethylene oxides, condensates of alkylene oxides with glycols and other compounds containing two or more hydroxyl groups such as glycerol, 1,4-phenylene-bis-carbonyloxyethyl-, unsaturated polyvalent grouping such as may be derived from pentaerythritol dialkyl ether, and polymeric chains to which the groups X are attached directly or through pendant groups, as for example in addition polymers and copolymers of esters of acrylic or methacrylic acids in which the group X is attached to the alkyl esterifying group.

As optionally substituted groups which may be represented by R$^1$, R$^2$ or R$^3$ there may be mentioned alkyl groups preferably containing from 1 to 4 carbon atoms such as ethyl, n and isopropyl, n-butyl, and especially methyl, but also n-octyl, n-decyl, n-dodecyl and n-octadecyl, cycloalkyl groups such as cyclohexyl, alkenyl groups such as allyl, aralkyl groups such as benzyl and β-phenylethyl, and substituted derivatives of these such as β-hydroxyethyl, β-hydroxypropyl, β-methoxyethyl, β-cyanoethyl, β, γ-dihydroxypropyl and β-hydroxyoctyl. Any one of the groups R$^1$, R$^2$ or R$^3$ may be joined to the same group in a second ammonioamidate residue to form an optionally substituted hydrocarbyl linking group such as an alkylene group. The value of $n$ is preferably 2.

As heterocyclic rings which may be represented by R$^1$ and R$^2$ and the nitrogen atom there may be mentioned morpholino, piperidino, pyrrolidino, piperazino and hexamethylene imine, and as heterocyclic rings which may be represented by R$^1$, R$^2$, R$^3$ and the nitrogen atom there may be mentioned pyridinium, picolinium, quinolinium, dipyridylium, 1,4-bis-azoniabicyclo[2,2,2]-octane, quinuclidinium and substituted derivatives of these such as carboxypyridinium groups.

As specific examples of ammonioamidates of the invention there are mentioned N,N'-bis(trimethylammonio)decamethylenebis-(oxyformamidate), N, N'-di(1-pyridinio)propylene-2,2-bis-(4-phenoxyformamidate), N, N'-di-(1-pyridinio)methylenebis-(4-phenylsulphonamidate), N, N'-bis-(trimethylammonio)oxybis-(4-phenylsulphonamidate) and N, N'-bis-(trimethylammonio)oxybis-(4-phenylsulphonamidate) and N,N'-bis-(4-methyl-4-morpholinio)hexamethylenebis-(oxyformamidate).

According to the invention there is also provided a process for the manufacture of ammonioamidates of the invention which comprises reacting a hydrazide of the formula

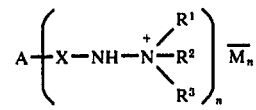

wherein A, X, R$^1$, R$^2$, R$^3$ and $n$ have the meanings given hereinbefore and $\overline{M}$ is an anion, with a basic compound.

As basic compounds there may be mentioned for example alkalis such as alkali metal hydroxides, e.g. sodium and potassium hydroxides, alkali metal carbonates such as sodium and potassium carbonates, alkali metal bicarbonates and anion exchange resins in the hydroxide form.

The process of the invention is conveniently carried out by stirring the hydrazide and basic compound, preferably used in excess of up to 100%, in a solvent such as a lower alcohol, e.g. ethanol. Reaction temperatures between room temperatures and 100° C may be used, the preferred temperature in each case depending upon the circumstances, such as the basic compound being used. The ammonioamidate may usually be isolated by removal of inorganic materials, for example by precipitation with ethyl ether, and evaporation preferably under reduced pressure.

The hydrazides used in the process of the invention may be prepared from the corresponding compounds of the formula A-(X-halogen)$_n$, the halogen being preferably chlorine, by reaction with a hydrazine of the formula NH$_2$—NR$^1$R$^2$ to give a hydrazide derivative of the formula A-(X-NH-NR$^1$R$^2$)$_n$ followed by quaternisation with an alkylating agent of the formula R$^3$M wherein M is an anion forming group, such as chlorine, bromine or iodine p-toluenesulphonate, or methosulphate. The method cannot be used when R$^1$, R$^2$ and R$^3$ together with the nitrogen atom form one or two heterocyclic rings.

Alternatively the hydrazide may be obtained by reaction of the compound of the formula A-(X-halogen)$_n$ with a quaternary hydrazine of the formula [NH$_2$-$\overset{+}{N}$HR$^1$R$^2$R$^3$]$_x$ M$^{x-}$ wherein M is an anion forming group of functionality $x$, with a basic compound. This reaction and the conversion of the hydrazide into an ammonioamidate may be carried out in one state, and this represents a further feature of the invention. This method is suitable for the preparation of any of the ammonioamidates of the invention.

An alternative process, suitable for the manufacture of ammonioamidates of the invention wherein $R^3$ is a β-hydroxyalkyl group, comprises reacting the hydrazine derivative of the formula $A\text{-}(X\text{-}NH\text{-}NR^1R^2)_n$ with an epoxide such as ethylene or propylene oxide. The process may be carried out in a solvent such as tert.-butanol at a temperature preferably between 20° C and 150° C.

Alternatively the epoxide may be first reacted with a hydrazine of the formula $H_2N\text{—}NR^1R^2$ either in the absence of solvent or in an aprotic polar solvent, such as ethylene glycol dimethyl ether and the reaction product treated with a compound of formula $A\text{-}(X\text{-halogen})_n$, the ammonioamidates wherein $R^3$ is a β-hydroxyalkyl group being obtained upon treatment with basic compounds in the manner described above.

The hydrazides used in the process of the invention may also be prepared by alkylation of hydrazines of the formula $A\text{-}(X\text{-}NH\text{-}NH_2)_n$ or $A\text{-}(X\text{-}NH\text{-}NHR^1)_n$ with alkylating agents such as $R^2M$. Such methods are only suitable for the preparation of ammonioamidates wherein $R^1$, $R^2$ and $R^3$ are the same or $R^2$ and $R^3$ are the same respectively.

The ammonioamidates of the invention wherein A is a chain of an addition polymer may also be obtained from the polymerisable unsaturated ammonioamidates described in our copending application Ser. No. 55660/73 by polymerisation or by copoylmerisation with other polymerisable unsaturated compounds, and this represents a further feature of the invention.

Suitable polymerisable ammonioamidates are for example N-trimethylammonio-β-acryloyloxyethoxyformamidate, N-trimethylammonio-β-methacryloyloxyethoxyformamidate, N-trimethylammonio-β-methacryloyloxypropoxyformamidate and N-(4-methyl-4-morpholinio)-β-acryloyloxyethoxyformamidate.

Suitable copolymerisable unsaturated compounds are butyl acrylate, methoxypolyethyleneoxy acrylate, methyl acrylate, methyl methacrylate, β-dialkylaminoethyl acrylates, acrylamides, and vinyl pyrrolidone.

The polymerisation or copolymerisation may for example be carried out in a solvent such as carbon tetrachloride, benzene, toluene or ethylene dichloride using a polymerisation catalyst such as α-α'-azodiisobutyronitrile, or in aqueous medium using a catalyst system such as potassium persulphate and potassium metabisulphite in presence of a surfactant such as sodium dodecylbenzenesulphonate.

The amonioamidates of the invention are solid compounds, soluble in water except in those cases wherein the group A is devoid of water solubilising groups and constitutes a major part of the molecule of the ammonioamidate.

The ammonioamidates of the invention may be used as cross-linking agents for polymers, as chain extending agents for e.g. polyepoxides and other polyfunctional compounds, as bonding agents and adhesives for use with polymers or other materials, and as coating agents. As polymers which may be cross-linded there may be mentioned natural rubber, synthetic rubbers such as styrenebutadiene, acrylonitrile-butadiene, ethylene-propylene rubbers, stereo-regular polyisoprene, high or low density polyethylene, polypropylene, nylons, polyurethanes etc. Any of the above polymers for example styrene-butadiene rubber may be bonded to the same polymer, or a different polymer as for example stereo-regular polyisoprene, or to other materials such as polyethylene terephthalate, nylon-6, nylon-6,6, rayon and metal substrates such as copper, brass and steel by means of the ammonioamidates of the invention.

The ammonioamidates may be incorporated into the polymer by for example blending with the polymer in any conventional manner, such as on a two-roll mill, this type of procedure being especially suitable when the ammonioamidate is to be used as a cross-linking agent and must be present throughout the bulk of the polymer. The polymer is thereafter shaped, for example in a mould, and heated to a temperature above 50° C, and preferably between 100° and 250° C, to bring about cross-linking. The cross-linking may also be brought about by exposure to ultra-violet light, but usually this will only bring about reaction at the surface exposed to the light.

For use as a bonding agent or adhesive, in which cases application of the ammonioamidate only at the surfaces of the polymer is usually necessary, it is generally more convenient and economical to treat the polymer in shaped form, e.g. in filament, yarn, fabric, sheet or massive form, with a solution of the ammonioamidate in, for example, water, and then heat the treated polymer to drive off the water or solvent, bring the surfaces to be bonded, e.g. polyester cord and rubber, into contact, and then heat more strongly to effect bonding. An auxiliary bonding agent such as an epoxy resin and resorcinol/formaldehyde reaction product may also be present to aid adhesion. Ammonioamidates where A is an unsaturated polyvalent grouping are particularly useful for polyester to rubber bonding.

A similar procedure may be adopted to provide surfaces with coatings except that in this case contacting of the surfaces is omitted. Exposure to ultra-violet light may in these cases be used satisfactorily as an alternative to heating.

The ammonioamidates of the invention may also be used for any of the purposes for which the monofunctional ammonioamidates of our copending application No. 55660/73 are used, the group A being selected to suit the proposed application. For example coatings may be applied which will confer water-repellency (A contains long chain alkyl or fluoroalkyl groups or silicone polymer residues) or antistatic and antisoil properties (A contains polyalkylene oxide groups), or the polymer may be provided with a coloured coating (A contains a dyestuff residue), a protective coating against oxidation (A contains arylamine or phenolic residues) or coatings protective against fungal or bacterial attack (A contains bacterostatic or fungistatic groups).

The ammonioamidates in which A contains long chain alkyl groups may also have surfactant properties, and the ammonioamidates in general are accelerators for the sulphur vulcanisation of rubber, and catalysts for the formation of polyurethanes from polyisocyanates and polyhydroxylic compounds and other base-catalysed reactions.

The uses of the ammonioamidates as listed hereinbefore provide further features of the invention.

The invention is illustrated but not limited by the following Examples in which all parts and percentages are by weight unless otherwise stated.

EXAMPLE 1

Phosgene gas (100 parts) was added to a suspension of 2,2-bis-(4'-hydroxphenyl)propane (114 parts; 0.5 mole) in monochlorobenzene (450 parts at 0°–5° C, followed by a solution of N,N-dimethylaniline (121 parts; 1.0 mole) in monochlorobenzene (150 parts) added dropwise over 1 hour at 5°–10° C. The reaction temperature was raised to 40°–45° C for 2 hours after which time excess phosgene was blown off with a stream of dry nitrogen. The reaction mixture was washed by shaking with water (2 × 250 parts), N-hydrochloric acid (250 parts), and water (250 parts) and dried over anhydrous magnesium sulphate. The mixture was filtered and the filtrate evaporated to dryness under reduced pressure to give 2,2-bis-(4'-chlorocarbonyloxyphenyl)propane (176 parts), m.p. 75° C.

A solution of the above chloroformate (53.3 parts; 0.15 mole) in chloroform (250 parts) was added dropwise over 30 minutes to a solution of N,N-dimethylhydrazine (18 parts; 0.3 mole) in chloroform (50 parts) at 30°–35° C. The reaction mixture was stirred for 12 hours and then washed with water (3 × 250 parts) and dried over anhydrous magnesium sulphate. The mixture was filtered and the filtrate evaporated to dryness under reduced pressure to give 2,2-bis(4-N,N-dimethylhydrazinocarbonyloxyphenyl) propane (49 parts) m.p. 70° C.

A mixture of the above bis-hydrazide (28 parts) and methyliodide (150 parts) was heated under reflux for 24 hours. A yellow solid which formed was filtered off, washed with diethyl ether and dried in vacuo to give the diiodide (38 parts), m.p. 114°–115° C.

A mixture of the above diiodide (20.4 parts; 0.03 mol), ethyl alcohol (90 parts) and potassium carbonate (12.4 parts; 0.09 mol) was stirred at 40°–45° C for 12 hours. The reaction mixture was filtered to remove potassium carbonate/bicarbonate and the filtrate diluted with diethyl ether (90 parts) to precipitate potassium iodide. The mixture was filtered and the filtrate evaporated to dryness under reduced pressure at 40° C. The solid was dried to constant weight under high vacuum over phosphorous pentoxide to give N,N-bis(trimethylammonio)propylene-2,2-bis(4-phenoxyformamidate) as a white solid (11.1 parts), m.p. 75° C. Infra red spectrum of the product showed a characteristic carbonyl peak at 1665 cm$^{-1}$.

EXAMPLE 2

Resorcinol (82.5 parts) was treated with phosgene (150 parts) in the presence of N,N-dimethylaniline (181.5 parts) in monochlorobenzene (500 parts) by the procedure described in Example 1 to give 1,3-bis(-chlorocarbonyloxy)benzene (148 parts), b.p. 114° C/1.5 mm, m.p. 46° C.

A solution of 1,3-bis(chlorocarbonyloxy)benzene (35.25 parts) in toluene (35 parts) was added dropwise over 30 minutes to a solution of N,N-dimethylhydrazine (36 parts) in toluene (35 parts) at 25°–30° C. The reaction mixture was stirred for 48 hours at 25° C. and then filtered. The filter cake was extracted with chloroform (600 parts) at 45° C and the mixture shaken with water (2 × 200 parts). The chloroform layer was separated and dried over anhydrous magnesium sulphate, filtered and evaporated to dryness under reduced pressure to give 1,3-bis(N,N-dimethylhydrazinocarbonyloxy)benzene as a crystalline solid (41 parts), m.p. 134°–140° C.

A mixture of the above hydrazide (35.2 parts), methyl iodide (100 parts) and methanol (40 parts) was heated under reflux for 18 hours. The reaction mixture separated into two layers and the upper layer was separated and evaporated to constant weight at 40° C/15 mm pressure to give the bis-trimethylammonium iodide as a clear, viscous oil (54 parts).

Found: C 30.0; H 4.7; N 9.8; I 41.0%; C$_{14}$H$_{24}$N$_2$O$_4$I$_2$ requires C 29.7; H 4.2; N 9.9; I 44.9%.

A mixture of the above quaternary ammonium iodide (56 parts), ethyl alcohol (150 parts) and potassium carbonate (41.4 parts) was stirred under reflux for 12 hours after which time the mixture was filtered. Diethyl ether (150 parts) was then added to the filtrate followed by DY3 carbon (2 parts). The mixture was shaken and filtered and solvents removed at 35° C and 15 mm. pressure to give N,N'-bis(trimethylammonio)-phenylene-1,3-bis(oxyformamidate), a hydroscopic, grey solid (24 parts), m.p. 56° C. Infra red spectrum showed a characteristic carbonyl peak at 1670 cm$^{-1}$.

EXAMPLE 3

1,4-Bis-(α-hydroxyethoxy)benzene (29.7 parts; 0.15 mole) was suspended in methylene dichloride (700 parts) and the mixture added in portions (100 parts) to a stirred solution of phosgene (75 parts; 0.75 mole) in methylene dichloride (50 parts) below 10° C. The temperature was raised to 25° C and the reaction mixture stirred for 24 hours. More phosgene (50 parts) was added and the reaction stirred for further 12 hours at 30° C and then for 8 hours at 35° C to form a clear solution. Excess phosgene was then blown off with a stream of dry nitrogen and the solvent removed at 40° C and reduced pressure to give the corresponding bis-chloroformate (46 parts), m.p. 69° C.

Found: Hydrolysable chloride 21.1%; C$_{12}$H$_{12}$Cl$_2$ O$_6$ requires Cl 21.4%.

The above bis-chloroformate (32.3 parts; 0.1 mole) was reacted with N,N-dimethylhydrazine (24 parts; 0.4 mole) in toluene (100 parts) according to the method described in Example 2 to give the bis-N,N-dimethylhydrazide as a white solid (35 parts), m.p. 180° C.

A mixture of the above bis-N,N-dimethylhydrazide (35 parts), methyl iodide (100 parts) and methanol (15 parts) was heated under reflux for 18 hours, during which time a yellow solid formed. The solid was filtered off, washed with ether (100 parts) and dried in vacuo to give the corresponding bis-N,N,N-trimethylhydrazinium iodide (54 parts), m.p. 150° C.

A mixture of the above iodide (6.5 parts; 0.01 mole), ethyl alcohol (30 parts) and potassium carbonate (4.2 parts; 0.03 mole) was bicarbonate under reflux for 12 hours. Potassium carbonate and off were filtered off and the filtrate diluted with diethyl ether (30 parts) to precipitate potassium iodide. The mixture was filtered and the filtrates evaporated to constant weight at 40° C under reduced pressure to give N,N'-bis(trimethylammonio)phenylene-1,4-bis(oxyethoxyformamidate) as a hydroscopic, white solid (2.7 parts) m.p. 55° C. The infra red spectrum showed a characteristic carbonyl band at 1640 cm$^{-1}$.

EXAMPLE 4

The bis-chloroformate (9.5 parts), obtained from bis-β-hydroxyethylterephthalate by the procedure of Example 3, was reacted with N,N-dimethylhydrazine (6 parts) in methylene dichloride (60 parts) at room temperature to give the bis-N,N-dimethylhydrazide (11 parts), m.p. 158°–160° C.

Quaternisation with methyl iodide at room temperature gave the bis-N,N,N-trimethylhydrazinium iodide, m.p. 132°–134° C. Treatment with aqueous (8N) potassium carbonate gave N,N'-bis-(trimethylammonio)- terephthaloyloxy-bis(ethoxyformamidate), m.p. 180° C (decomp.). The infra red spectrum showed a characteristic carbonyl band at 1630–1660 cm$^{-1}$.

EXAMPLE 5

Hexane-1,6-diol (236 parts; 2.0 mole) in methylene dichloride (1800 parts) and chloroform (250 parts) was reacted with phosgene (600 parts) at 5°–15° C for 18 hours essentially using the method described in Example 3, to give 1,6-hexamethylene dichloroformate (417 parts), b.p. 125° C/1.5 mm.

1,6-Hexamethylene dichloroformate (364.5 parts; 1.5 mol) was reacted with N,N-dimethylhydrazine (360 parts; 6.0 mole) in toluene (800 parts) according to the method described in Example 2 to give the corresponding bis-N,N-dimethylhydrazide (435 parts), m.p. 94° C.

Found: C 49.7; H 8.96; N 19.3%; $C_{12}H_{26}N_4O_4$ requires C 49.9; H 8.9; N 18.6%.

The above bis-hydrazide (290 parts; 1.0 mole), methanol (50 parts) and methyl iodide (300 parts) were heated together under reflux for 1 hour, after which time the solid was filtered off, washed with ether and dried in vacuo to give the bis-N,N,N-trimethylhydrazinium iodide (564 parts), m.p. 165° C.

The above bis-quaternary ammonium iodide (517 parts; 0.9 mole) in ethyl alcohol (1000 parts) was treated with 1N alcoholic potassium hydroxide (1800 parts; 1.8 mole). Diethyl ether (1000 parts) was then added, the reaction mixture filtered, the filtrates were evaporated to dryness under reduced pressure at 40° C, and the residue extracted with isopropanol (2000 parts) at 0° C. The isopropanol extract was filtered and then evaporated to dryness under reduced pressure at 40° C to give N,N'-bis(trimethylammonio)hexamethylene-1,6-bis(oxyformamidate) (119 parts), m.p. 146° C.

Found: N 17.2%; $C_{14}H_{30}N_4O_4$ requires N 17.6%. Infra red spectrum showed a characteristic carbonyl peak at 1625 cm$^{-1}$.

A similar product, N,N'-bis(ethyldimethylammonio)hexamethylene-1,6-bis(oxyformamidate) was obtained by using ethyl iodide as the quaternising agent instead of methyl iodide.

EXAMPLE 6

Butane-1,4-diol (270 parts; 3.0 mole) in methylene dichloride (800 parts) and chloroform (150 parts) was reacted with phosgene (800 parts; 8.0 mole) at 5°–15° C for 6 hours essentially using the method described in Example 3 to give butane-1,4-dichloroformate (612 parts), b.p. 89° C/1.0 mm.

Found: Cl 33.8%; $C_6H_8O_4Cl_2$ requires Cl 33.0%.

The butane-dichloroformate (215 parts; 1.0 mole) was then reacted with N,N-dimethylhydrazine (240 parts; 4.0 mole) in toluene (1000 parts) according to the method described in Example 2 to give the corresponding bis-N,N-dimethylhydrazide (205 parts), m.p. 126° C.

Found: C 46.1; H 8.1; N 20.6%; $C_{10}H_{22}N_4O_4$ requires C 45.8; H 8.4; N 21.4%.

The above bis-hydrazide (183.4 parts) was reacted with methyl iodide (190 parts) in methanol (50 parts) at 40° C for 3 hours and the solid formed dried to constant weight in vacuo to give the bis-N,N,N-trimethylhydrazinium iodide (380 parts), m.p. 140° C.

Found: N 9.5; I 44%; $C_{12}H_{28}N_4O_4I_2$ requires N 10.3; I 46.5%.

The above quaternary ammonium iodide (380 parts) in ethyl alcohol (1000 parts) was treated with 1N alcoholic potassium hydroxide (1400 parts) essentially using the method described in Example 5 to give N,N'-bis(trimethylammonio)tetramethylene-1,4-bis(oxyformamidate) (130 parts).

Alternatively, the above bis-N,N-dimethylhydrazide (26.2 parts; 0.1 mole) was reacted with dimethyl sulphate (30 parts) in acetone (50 parts) at 50° C for 2 hours, after which time the reaction mixture was allowed to cool to 25° C. A white solid which separated was filtered off, washed with acetone (10 parts) and dried to constant weight in vacuo to give the bis-N,N,N-trimethylhydrazinium methosulphate (41 parts), m.p. 125° C.

The above bis-quaternary ammonium methosulphate (40 parts) was treated with potassium carbonate (55.2 parts) in ethyl alcohol (250 parts) for 36 hours, according to the method described in Example 2, to give the bis(trimethylammonio-oxyformamidate) (24.3 parts), m.p. 165° C. Inra red spectrum shows a characteristic carbonyl peak at 1620 cm$^{-1}$.

EXAMPLE 7

Diethylene glycol (138 parts) was added dropwise to a solution of phosgene (300 parts) in a methylene dichloride (200 parts) at 0°–5° C during 1 hour. The reaction mixture was warmed to 25° C during 3 hours and then excess phosgene was blown off with a stream of dry nitrogen. The solvent was removed at 40° C under reduced pressure and the residue distilled under nitrogen at reduced pressure to give the diethylether-bis-chloroformate (220 parts), b.p. 107° C at 0.75 mm.

The diethylether-bis-chloroformate (57.7 parts) was added dropwise to a solution of N,N-dimethylhydrazine (160 parts) in toluene (300 parts) over 1 hour at 30° C and the reaction mixture stirred for 12 hours. A white solid was filtered off, dissolved in chloroform (500 parts) and the solution was washed with water, dried over magnesium sulphate, filtered and evaporated to dryness at 40° C under reduced pressure to give the bis-hydrazide (45 parts) m.p. 112° C.

Found: C 42.8; H 8.2; N 18.1%; $C_{10}H_{22}N_4O_5$ requires C 42.4; H 7.9; N 20.1%.

The bis-hydrazide (27.8 parts) dissolved in acetone (150 parts) was quaternised with dimethyl sulphate (30 parts) to give the bis-quaternary sulphate (48 parts), m.p. 122° C. Treatment with potassium carbonate (55.2 parts) in ethyl alcohol (250 parts) followed by filtration and evaporation of the filtrate under reduced pressure gave N,N'-bis(trimethylammonio)diethylether-bis-(oxyformamidate) (29 parts), m.p. 134° C. Infra red spectrum showed a characteristic carbonyl peak at 1640 cm$^{-1}$.

EXAMPLE 8

Triethylene glycol (150 parts) in methylene dichloride (200 parts) was reacted with phosgene (1300 parts) at 0°–5° C over 2 hours, using the method described in Example 3, to give the bis-chloroformate (268 parts), b.p. 145° C/1.5 mm.

The bis-chloroformate (68.7 parts) in toluene (300 parts) was reacted with N,N-dimethylhydrazine (60 parts), followed by quaternisation of the bis-hydrazide (32.2 parts) in acetone (150 parts) with dimethylsulphate (30 parts) and treatment of the bis-quaternary salt with potassium carbonate according to the procedure described in Example 7 to give N,N-bis(trimethylammonio)diethoxyethane-bis-(oxyformamidate) as a pale yellow oil (26 parts). Infra red spectrum showed a characteristic carbonyl peak at 1640 cm$^{-1}$.

EXAMPLE 9

Polyethylene glycol of molecular weight approximately 300 in methylene chloride (200 parts) was reacted with phosgene (300 parts) at 0°–10° C over 2 hours using the method described in Example 3, to give the bis-chloroformate (411 parts).

A paste of the bis-chloroformate (137.5 parts) was then reacted with N,N-dimethylhydrazine (72 parts) followed by quaternisation of the bis-hydrazide with dimethyl sulphate and treatment with potassium carbonate according to the procedure described in Example 7, to give N,N'-bis(trimethylammonio)polyethoxyethane-bis(oxyformamidate) (41 parts). Infra red spectrum showed a characteristic carbonyl peak at 1640 cm$^{-1}$.

EXAMPLE 10

1,10-Decamethylene glycol (52.2 parts; 0.3 mole) in methylene dichloride (800 parts) was reacted with phosgene (100 parts) at 20°–25° C for 24 hours essentially using the method described in Example 3, to give 1,10-decamethylene glycol dichloroformate (90 parts).

Found: Cl 24.8%; $C_{12}H_{20}O_4Cl_2$ requires Cl 23.7%.

1,10-Decamethylene glycol dichloroformate (44.9 parts; 0.15 mole) was then reacted with N,N-dimethylhydrazine (36 parts; 0.6 mole) in toluene (250 parts) according to the method described in Example 2, to give the corresponding bis-hydrazide (47 parts), m.p. 106° C.

The above bis-hydrazide (43.2 parts), methanol (20 parts) and methyl iodide (100 parts) were heated together under reflux for 24 hours, after which time the solvent was removed at 40° C under reduced pressure to give the derived bis-N,N,N-trimethylhydrazinium iodide (79 parts), m.p. 125° C.

The above quaternary ammonium iodide (12.6 parts) was treated with potassium carbonate (8.4 parts) in ethyl alcohol (60 parts) according to the method described in Example 2 to give N,N'-bis(trimethylammonio)decamethylene-bis(oxyformamidate) as a white solid (6.7 parts), m.p. 115°–117° C.

Found: C 57.7; H 9.8; N 14.0%; $C_{18}H_{38}N_4O_4$ requires C 57.7; H 10.2; N 15.0%. Infra red spectrum showed a characteristic band at 1640 cm$^{-1}$.

EXAMPLE 11

Polyethylene glycol of molecular weight approximately 1000 (250 parts) was heated to 40° C and phosgene (55 parts) bubbled in with stirring at the rate of about 1.0 part per minute. The reaction mixture was stirred at 40° C for 3 hours and excess phosgene removed under reduced pressure using nitrogen, to give the bis-chloroformate (281 parts).

A part of the bis-chloroformate (112.5 parts) was then reacted with N,N-dimethylhydrazine (25 parts), followed by quaternisation of the bis-hydrazide with methyl iodide and treatment with potassium carbonate according to the procedure described in Example 10 to give N,N'-bis(trimethylammonio)polyethanoxy-bis(oxyformamidate)as a white, waxy solid (120 parts).

EXAMPLE 12

Oxyethylated glycerol (28.5 parts) having a molecular weight of 1130 was heated to 40° C and phosgene (8.3 parts) was bubbled into the liquid with stirring at the rate of about 0.08 part per minute. The reaction mixture was stirred at 40° C for a further 3 hours and excess phosgene then removed under reduced pressure with a stream of nitrogen. The chloroformate so obtained was then reacted with excess N,N-dimethylhydrazine in chloroform followed by quaternisation with methyl iodide and treatment with potassium carbonate as described in Example 1, to give a tristrimethylammonioformamidate having an average of about 24 ethylene oxide units per molecule.

EXAMPLE 13

Diphenyl ether 4,4'-disulphonyl chloride was dissolved in toluene (200 parts) and the solution cooled to 10° C. N,N-dimethylhydrazine (36 parts; 0.6 mole) was then added dropwise over 30 minutes at 10°–15° C, after which the mixture was stirred at room temperature for 12 hours. The solid was filtered off and dissolved in ethyl acetate (1000 parts) at 90° C. The solution was washed with water (2 × 250 parts), dried over anhydrous magnesium sulphate, and evaporated at 45° C under reduced pressure to give the bis-sulphonyl hydrazide as a white solid (50 parts), m.p. 132° C.

Found: N 13.6; S 15.3%; $C_{16}H_{22}O_5S_2N_4$ requires N 13.5; S 15.5%.

A mixture of the above N,N-dimethylhydrazide (52 parts), methanol (50 parts) and methyl iodide (300 parts) was heated under reflux for 36 hours, during which time a yellow solid formed. The solid was filtered off, washed with diethyl ether and dried in vacuo to give 4,4'-bis(N,N,N-trimethylhydrazinium sulphonyl)-diphenylether diiodide (32 parts), m.p. 132°—4° C.

The above quaternary iodide (6.9 parts; 0.01 mol) was dissolved in ethyl alcohol (20 parts) and the solution treated with alcoholic potassium hydroxide (20 parts; 0.02 mol). The reaction mixture was stirred at 25° C for 2 hours, followed by 1 hour at 60° C. The reaction mixture was filtered and the filtrate diluted with diethyl ether (40 parts) to form a white precipitate. The solid was filtered off and dried in a desiccator to give the bis-ammoniosulphonamidate as a white solid (3.5 parts), m.p. 88° C.

Found: C 49.1; H 6.0; N 12.9%; $C_{18}H_{26}N_4O_5S_2$ requires C 48.8; H 5.9; N 12.7%. The infra red spectrum showed characteristic —NSO$_2$—bands at 1265 and 1125 cm$^{-1}$.

EXAMPLE 14

Diphenylmethane-4,4'-disulphonyl chloride (54.7 parts; 0.15 mol) was dissolved in toluene (300 parts) and the solution cooled to 10°–15° C; N,N-dimethylhydrazine (36 parts; 0.6 mol) was then added dropwise over 1 hour at 10°–15° C, after which time the reaction mixture was stirred for 16 hours at 250C. The solid which separated was filtered off, dissolved in chloroform (500 parts), the solution washed with water (2 × 250 parts), dried over anhydrous magnesium sulphate and evaporated at 40° C under reduced pressure to give the bis-sulphonyl hydrazide as a white solid (52.5 parts), m.p. 100° C.

Found: C 49.3; H 6.4; S 15.2%; $C_{17}H_{24}O_4N_4S$ requires C 49.5; H 5.8; S 15.5%.

The above bis-hydrazide (51.5 parts) in methanol (100 parts) was quaternised with methyl iodide (200 parts) using the method given in Example 2, to give the diiodide as a brownish solid (54 parts), m.p. 68° C.

A mixture of the above iodide (48 parts), ethyl alcohol (100 parts) and N alcoholic potassium hydroxide solution (138 parts) was stirred at 25° C for 12 hours and then filtered. Diethyl ether (225 parts) was added then to the filtrates to precipitate a yellow oil. The oil was separated, extracted with ethyl alcohol (75 parts), the solution filtered and evaporated to dryness under reduced pressure to leave the bis-ammoniosulphonamidate as a hydroscopic yellow solid (17 parts), m.p. 62° C.

Found: S 14.8%; $C_{19}H_{28}N_4O_4S_2$ requires S 14.5%. The infra red spectrum showed bands at 1250 and 1140 cm$^{-1}$.

EXAMPLE 15

N-trimethylammonio-$\beta$-acryloyloxyethoxyformamidate was prepared by the procedure described in our copending Application No. 55660/73, in which $\beta$-hydroxyethyl acrylate was reacted with phosgene in methylene dichloride at 10° C, and then with N,N-dimethylhydrazine in toluene at 10°–20° C, followed by quaternisation with methyl iodide at room temperature and treatment with potassium carbonate in ethanol at 25° C.

N-trimethylammonio-$\beta$-acryloyloxyethoxyformamidate (15 parts) was dissolved in carbon tetrachloride (15 parts) and stirred at 45°–50° C under nitrogen. A solution of $\alpha$, $\alpha'$-azodiisobutyronitrile (10.3 parts) in carbon tetrachloride was added over 4 hours at 45°–50° C during which time the solution thickened and eventually deposited a rubbery polymer. This was separated from the reaction liquors, washed with diethyl ether and dried in vacuo, to give a rubbery white polymer (12 parts) of the formula:

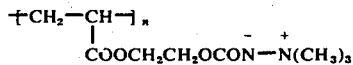

where the average $n$ is from 4 to 25 depending on the reaction temperature and time.

Co-polymerisation of the N-trimethylammonio-$\beta$-acryloyloxy ethoxyformamidate (1 mole) with butyl acrylate (5 moles) under similar conditions gave a white, rubbery copolymer of molecular weight about 5000.

EXAMPLE 16

A solution of N-trimethylammonio-$\beta$acryloyloxyethoxyformamidate (5 parts) and sodium dodecylbenzene sulphonate (0.4 parts) in water (25 parts) was treated dropwise under nitrogen with a solution of potassium metabisulphite (0.3 parts) in water (10 parts) and potassium persulphate (0.3 parts) in water (2 parts) over 3 hours at 20°–25° C. The reaction mixture was stirred for a further 14 hours to give a cloudy, aqueous emulsion (43 parts) containing 11.6% polymeric ammonioamidate similar to that prepared in the preceding Example 15.

Co-polymerisation of methoxy-polyethylene glycol 350 acrylate, containing about 7.25 ethylene oxide units per molecule, (5 moles) with N-trimethylammonio-$\beta$-acryloyloxyethoxyformamidate (1 mole) by the above procedure gave a water-soluble co-polymer.

EXAMPLE 17

Hydroxylamine-O-sulphonic acid (12.15 parts) was dissolved in water (100 parts) and neutralised at below 20° C with a solution of potassium hydroxide (6.02 parts) in water. Pyridine (40 parts) was then added and the mixture heated at 70°–80° C for 3 hours, cooled and treated with anhydrous potassium carbonate (13.8 parts). After standing for 18 hours at room temperature the mixture was evaporated to dryness at below 50° C, and the residue extracted several times with chloroform to a total of 500 parts by volume. The chloroform extracts were filtered, combined and anhydrous potassium carbonate (20 parts) and 2,2-bis(4-chlorocarbonyloxyphenyl)propane, prepared as described in Example 1 (177 parts) added. The mixture was allowed to stand at room temperature for 70 hours and stirred at 50°–60° C for 3 hours, then filtered and the chloroform evaporated to give a crude product (28 parts).

Trituration with tetrahydrofuran gave a solid (4.75 parts) which was recrystallised from dioxan to give a product m.p. 152°–154° C identifiable by infra red, NMR and elementary analysis as N,N-di(1-pyridinio)-propylene-2,2-bis(4-phenoxyformamidate).

EXAMPLE 18

Phosgene (100 parts) was passed into methylene dichloride (100 parts by volumme) at 0°–5° C, and a solution of hexane-1,6-diol (35.4 parts) in methylene dichloride (750 parts by volume) was then added in several portions at 5°–10° C allowing 30 minutes between each addition. The reaction mixture was stirred for 18 hours warming to room temperature, then degassed with a nitrogen stream for 5 hours at room temperature. Methylene dichloride was removed under atmospheric pressure and the residue stirred at room temperature under a pressure of 18 mm of mercury for 1 hour. Hexane-1,6-diol bis-chloroformate (65 parts) was obtained as a clear liquid.

To a suspension of 1-amino-pyridinium iodide (8.88 parts) suspended in ethanol(250 parts by volume) were added concurrently molar alcoholic potassium hydroxide (50 parts), and hexane-1,6-diol bis-chloroformate (5.35 parts dissolved in 50 parts by volume of ethanol) at such a rate that a purple colour was maintained in the reaction mixture. After stirring for 3 hours at room temperature the reaction mixture was evaporated to dryness under partial vacuum, dissolved in 10% aqueous sodium carbonate (200 parts by volume) and the carbonate solution extracted with methylene dichloride. The extracts were dried over anhydrous sodium sulphate, and the methylene dichloride distilled off, leaving an oil. This was recrystallised from dioxane to give a solid (2.75 parts), m.p. 122°–125° C. Elementary analysis and infra red and NMR spectra identified the product as N,N'-di(1-pyridinio)hexamethylenebis(oxyformamidate).

EXAMPLE 19

Butane -1,4-dichloroformate prepared according to the method described in Example 3 (32.2 parts; 0.15 mole) was reacted with 1-aminopyridinium iodide (66.6 parts; 0.3 mole) and potassium hydroxide (33.6 parts; 0.6 mole) in chloroform (700 parts), according to the method described in Example 18 to give N,N'-di-(1-pyridinio)tetramethylene-1,4-bis(oxyformamidate) (12 parts), m.p. 145° C.

Found N 16.5%; $C_{16}H_{18}N_4O_4$ requires N 17.0%. Infra red spectrum showed a characteristic carbonyl peak at 1630 cm$^{-1}$.

This product was also prepared by the following procedure: Butane-1,4-dichloroformate (215 parts), 1-aminopyridinium sulphate (286 parts) potassium hydroxide (112 parts) and potassium carbonate (346 parts), were stirred in a mixture of water (200 parts) and t-butanol (500 parts) at 10°–15° C over 2 hours. Ethyl alcohol (300 parts) was then added and the reaction mixture stirred for further 48 hours at 25° C. The reaction mixture was filtered to remove potassium sulphate and evaporated to dryness under reduced pressure. The residue was dissolved in chloroform (1,000 parts), the solution treated with carbon, filtered, and evaporated to dryness at 45° C under reduced pressure to give N,N'-di-(1-pyridinio) tetramethylene-1,4-bis-(oxyformamidate) (180 parts).

EXAMPLE 20

Decane-1,10-dichloroformate prepared according to the method described in Example 10 (29.9 parts) was reacted with 1-amino-pyridinium sulphate (28.6 parts) and potassium carbonate (55.2 parts) in a mixture of water (50 parts) and t-butanol (150 parts) according to the method described in Example 19 to give N,N'-di-(1-pyridinio)decamethylene-1,4-bis(oxyformamidate) (20 parts), m.p. 60° C. Infra red spectrum showed a characteristic carbonyl peak at 1630 cm$^{-1}$.

EXAMPLE 21

Terephthaloyloxy-bis(ethoxychloroformate) prepared as in Example 4 (18.9 parts) was dissolved in ethylacetate (150 parts) and added dropwise to a slurry of 1-aminopyridinium sulphate (14.3 parts) and potassium carbonate (27 parts) in a mixture of water (20 parts) and tert.-butanol (60 parts) over 30 minutes at 5°–10° C. The reaction mixture was then stirred for 36 hours and filtered. The solid was washed with alcohol (200 parts) and the combined filtrates and washings evaporated to dryness under reduced pressure. The residue was dissolved in chloroform, the solution treated with carbon, dried over magnesium sulphate, filtered and evaporated to dryness to give N,N'-bis(1-pyridinio) terephthaloyloxy-bis(ethoxyformamidate), m.p. 126° C.

Found: C 58.3; H 4.6; N 10.5%; $C_{25}H_{22}N_4O_8$ requires C 58.3; H 4.5; N 11.3%.

EXAMPLE 22

1,4-Bis (β-chlorocarbonyloxyethoxy)benzene, prepared as described in Example 3, (145.5 parts) was reacted with a suspension of 1-amino-pyridinium sulphate (109 parts); potassium hydroxide (42 parts) and potassium carbonate (151.8 parts) in a mixture of water (350 parts) and tert.-butanol (700 parts) at 10°–15° C for 2 hours. The reaction mixture was stirred for a further 3 hours at 15° C and 48 hours at 25° C. The reaction mixture was then evaporated to dryness under reduced pressure at 45° C and the residue slurried in water, (1400 parts), at room temperature and in ethyl alcohol (1400 parts) at 60° C. The solid residue was filtered off, washed with ethyl alcohol and dried in vacuo to give N,N'-bispyridinio-1,4 phenylene-bis(oxyethoxyformamidate) (122 parts), m.p. 186° C. Infra red spectrum showed a characteristic carbonyl bond at 1630 cm$^{-1}$.

EXAMPLE 23

The bis-chloroformate prepared from diethylene glycol according to the method described in Example 10 (46.2 parts) was reacted with 1-amino-pyridinium sulphate (57.2 parts) and potassium carbonate (108 parts) in a mixture of water (80 parts) and ert.-butanol (250 parts) at 10–15° C over ½ hour, followed by 48 hours at 25° C. The reaction mixture was filtered to remove potassium sulphate and the filtrates evaporated to dryness at 45° C under reduced pressure. The solid was dissolved in chloroform (500 parts), the solution treated with carbon, dried over magnesium sulphate, filtered and evaporated to constant weight at 45° C under reduced pressure to give N,N'-di (1-pyridinio) diethylether-bis-(oxyformamidate) (55 parts). Infra red spectrum showed a characteristic carbonyl bond at 1635 cm$^{-1}$.

EXAMPLE 24

The bis-chloroformate prepared from triethylene glycol according to the method described in Example 8 (27.5 parts) was reacted with 1-aminopyridinium sulphate (42.9 parts), potassium carbonate (82.8 parts) in water (60 parts) and tert.-butanol (200 parts) according to the method described in Example 8 to give N,N'-di (1-pyridinio) diethanoxyethane-bis (oxyformamidate) (31 parts) as a pale brown solid, m.p. 110° C. Infra red spectrum showed a characteristic carbonyl bond at 1640 cm$^{-1}$.

EXAMPLE 25

The bis-chloroformate of molecular weight approximately 540 prepared from polyethylene glycol according to the method described in Example 9 (42.5 parts) was reacted with 1-aminopyridinium sulphate (28.6 parts), potassium carbonate (55.2 parts) in water (50 parts) and tert.-butanol (150 parts) according to the method described in Example 8 to give N,N-bis-(pyridinio) polyethoxyethane-bis (oxyformamidate) (53 parts) as a pale yellow oil. Infra red spectrum show a characteristic carbonyl bond at 1640 cm$^{-1}$.

EXAMPLE 26

Hexane-1,6-diol-bis-chloroformate, prepared as described in Example 18 (14.6 parts) was reacted with 1-amino-2,6-dimethyl pyridinium iodide (20 parts) and potassium carbonate (22 parts) suspended in a mixture of water (100 parts) and t-butanol (200 parts) at 20–25° C over 24 hours. The reaction mixture was evaporated to dryness and the residue was treated with chlororoform and filtered to remove inorgaic salts. The filtrates were evaporated and the resulting brown oil recrystallised from tetrahydrofuran to give N,N'-di(2,6-dimethyl-1-pyridinio) hexamethylene bis-(oxyformamidate) m.p. 170°–172° C.

Analysis found C = 63.4%; H = 7.8%; N = 13.5% Calculated for $C_{22}H_{30}O_4N_4$; H = 7.3%; N = 13.5%.

EXAMPLE 27

The 4-amino morpholine hydrochloride (55.4 parts) was added at 5° C. Sodium hydroxide (16 parts) dissolved in water (260 parts). Hexan-1,6-diol-bis-chloroformate prepared as in Example 18, (26.7 parts) in 540 parts of chloroform was added at 0° C. The reaction mixture was allowed to warm slowly to 20°–25° C, and was then evaporated to dryness. The residue was triturated with diethyl ether and then with water. The water insoluble material was filtered off and dried to give 1,6-bis-(morpholin-4-ylaminocarbonyloxy) hexane (25.4 parts) m.p. 197°–199° C which showed an infra red absorption at 1710 cm$^{-1}$.

1,6-Bis(morpholin-4-ylaminocarbonyloxy)hexane (26 parts) and neutralised dimethyl sulphate (116 parts) were stirred together at 50°–55° C for 16 days. The excess dimethyl sulphate was removed leaving the quaternary hydrazinium compound as a viscous brown oil showing an absorption in the infra red at 1750–1740 cm$^{-1}$. This was stirred with potassium carbonate (48.3 parts) and ethanol (500 parts) at 20°–25° C for 7 days. The reaction mixture was filtered and the filter-cake was washed with a little ethanol. The filtrate and washings were evaporated to dryness to yield N,H'-bis(4-methylmorpholinio) hexamethylene-bis-oxyformamidate as a brown oil having a carbonyl absorption in the infra red at 1625 cm$^{-1}$.

The ammonioamidate could be purified by dissolving in a little ethanol and adding oxalic acid dihydrate in ethanol to a pH of 3–4. The oxalate salt precipitated almost immediately and was filtered off. The ammonioamidate could be recovered by suspending the oxalate salt in water and adding sodium hydroxide solution to a pH of 7 when a clear solution was obtained. This was evaporated to dryness and the residue triturated with ethanol and filtered. The filtrates were evaporated to yield the ammonioamidate m.p. 90° C.

Analysis found N = 12.7%. Calculated for $C_{18}H_{34}O_6N_4$ N = 13.9%.

EXAMPLE 28

The procedure of Example 27 was repeated replacing the hexane-1,6-diol bis-chloroformate by an equivalent amount of 1,4-bis-(β-chlorocarbonyoxyethoxy)benzene, prepared as described in Example 3. 1,4-Bis(morpholin-4-ylaminocarbonyloxyethoxy)benzne, m.p. 219°–221° C, was obtained.

Quaternisation of this bishydrazide with dimethylsulphate and basification of the resultant bis-hydrazinium methosulphate with potassium carbonate in ethanol according to the method of Example 27 led to the formation of N,N'-bis(4-methylmorpholino) 1,4-phenylene bis(oxyethoxyformamidate) as a light brown solid m.p. 127° C.

Analysis found N = 11.290. Calcuted for $C_{22}H_{34}O_8N_4$ N = 11.6%

EXAMPLE 29

1-Aminopyridinium sulphate (14.3 parts) was dissolved in water (40 parts) and the solution was cooled to 10° C. Finely ground diphenylether-4,4'-disulphonylchloride (18.4 parts) was added in portions and at the same time sodium hydroxide 8 parts in water (80 parts) was added to maintain a pH of 12–13 in the reaction mixture. After the additions the reaction mixture was allowed to warm to 20°–25° C over 24 hours, stirred for 72 hours, and then filtered. The filter-cake was dried and extracted with methylene chloride. Methylene chloride was evaporated from the extracts to give a solid which was treated with ethanol at reflux, cooled and again filtered to give N,N'di(1-pyridinio)diphenylether-4,4' disulphon-amidate m.p. 229°–231° C.

Analysis Found: N = 11.4% S = 13.6%. Calculated for $C_{22}H_{18}O_5N_4S_2$. N = 11.6%; S = 13.3%

EXAMPLE 30

To a suspension of 1-aminopyridinium iodide (22.2 parts) in ethanol (500 parts by volume) were added concurrently molar alcoholic potassium hydroxide (270 parts by volume) and diphenyl ether-4,4'-disulphonyl chloride (36.7 parts) dissolved in chloroform (500 parts by volume). The mixture was stirred at room temperature for 48 hours, and then evaporated to dryness under partial vacuum. The residue was dissolved in aqueous isopropanol, molar alcoholic potassium hydroxide added to pH 11–12, and again evaporated to dryness. The residue (46 parts) was extracted with methylene chloride in a Soxhlet extractor to yield 11.3 parts of N,N'-di(1-pyridinio)diphenylether-4,4'-disulphonamidate, identical with the product obtained as described in Example 29.

EXAMPLE 31

In place of the diphenyl ether-4,4'-disulphonyl chloride of Example 26, diphenyl methane-4,4'-disulphonyl chloride was employed and the resulting N,N'-di(1-pyridinio)methylenebis(4-phenylsulphonamidate) was obtained as a solid, m.p. 130°–140° C.

EXAMPLE 32

2 parts of an ammonioamidate, 1 part of an epoxy resin commercially available under the name Epon 812 and 0.112 parts of surfactant (sodium dioctylsulphosuccinate) were added with stirring to 42 parts of water. Polyethylene terephthalate cord (3/1100) was passed through the above aqueous composition and then dried in an oven at 230° C for 45–60 seconds. The treated cord was then passed through an emulsion comprising a partly polymerised resorcinol/formaldehyde resin (16.2 parts), 25% aqueous sodium hydroxide (1.2 parts), 37% aqueous formaldehyde (11.8 parts), 41% aqueous polyvinylpyridine/styrene butadiene copolymer latex (244 parts), 28% aqueous ammonia (11.3 parts) and water (297 parts). The cord was then again dried in an oven at 230° C for 45–60 seconds.

A rubber mix was prepared from the following ingredients:

| | |
|---|---|
| Natural rubber | 100 parts |
| Zinc oxide | 3.5 parts |
| Stearic acid | 1.5 parts |
| General purpose furnace black | 35 parts |
| Processing oil | 3 parts |
| Sulphur | 2.5 parts |
| Benzthiazyl sulphencyclohexylamide | 1 part |

The treated cord was brought into contact with the rubber mix and the whole vulcanised at 150° C for 40 minutes. The bond between the rubber and the cord was measured by determining the force necessary to pull the cord out of the rubber.

| Ammonioamidate | Force to separate (kg) |
|---|---|
| None | 5.4 |
| Product of Example 5 | 7.9 |
| Product of Example 6 | 6.9 |
| Product of Example 18 | 9.5 |
| Product of Example 19 | 10.7 |
| Product of Example 22 | 11.3 |
| Product of Example 24 | 7.1 |

EXAMPLE 33

The bis(trimethylammonio oxyformamidate) of Example 6 was mixed with ten times its weight of a glycidyl ether of glycerol containing approximately 2 glycidyl groups per molecule. The mixture was stable on storage at room temperature. On heating at 180° C for 0.5 hours a tough, cured, rubbery film was obtained.

A similar film was obtained on heating at 180° C for 0.5 hours a mixture of the bis(pyridinio oxyformamidate) of Example 18 and the glycidyl ether used above.

What is claimed is:

1. A compound of the formula

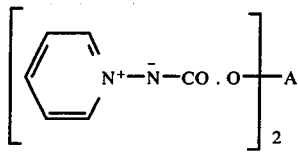

wherein A is a divalent radical selected from the class consisting of

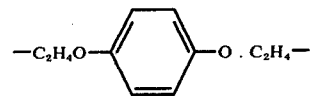

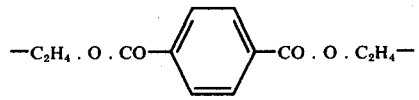

—(CH2)$_n$— where $n$ is 4 to 10 and
—CH$_2$CH$_2$(OCH$_2$CH$_2$)$_m$— where $m$ is 1 to 6.

* * * * *